3,288,683
PRODUCTION OF ACID-STABLE PROTEOLYTIC
AND AMYLOLYTIC ENZYME
Ichiro Tanaka, Nakanoku, Tokyo, Jiro Sawada, Kodaira, Tokyo, Tetsuo Misaki, Shinjukuku, Tokyo, and Hajime Yasui, Kitaku, Tokyo, Japan, assignors to Taisho Pharmaceutical Co., Ltd., Tokyo, Japan, a corporation of Japan
No Drawing. Filed Nov. 7, 1963, Ser. No. 322,583
4 Claims. (Cl. 195—66)

This invention relates to the production of an acid stable proteolytic and amylolytic enzyme. More particularly, this invention is concerned with an acid stable proteolytic and amylolytic enzyme which is obtainable by propagation of fungus of *Paecilomyces varioti* upon culture media, and the production of the enzyme therefrom.

In accordance with the present invention, it has been found that a fungus classified as *Paecilomyces varioti*, and particularly the strain thereof which is identified as *Paecilomyces varioti* TPR–200 (IAM 7999 and ATCC 14572) may be used advantageously for the production of an acid stable proteolytic and amylolytic enzyme.

Accordingly, a primary object of the invention is to use *Paecilomyces varioti* and particularly *Paecilomyces varioti* TPR 220 to produce a high yield of an acid stable enzyme which digests protein and starch at a high level of efficiency in acid medium.

Other objects of the invention will be evident from the following.

For a more complete understanding of the nature and scope of the invention, reference is made to the following detailed description, wherein presently-preferred illustrative embodiments of the invention are set forth.

With regard to acid stable protease whose optimum pH for protease activity is found to be near pH 3, and which is produced by a fungus selected from the group consisting of filamentous fungi, it has been reported (Yoshida: J. Agr. Chem. Soc. Japan, vol. 28, p. 66, 1954; Sakamoto and Shuzui: Hakkokogaku Zassi, Japan, vol. 35, p. 98, 1957; Matsushima: J. Agr. Chem. Soc. Japan, vol. 32, p. 215, 1958), that a black *Aspergillus niger* and *Aspergillus awamori* produce a higher yield of acid protease than of neutral- and alkaline-protease.

However, no yellow greenish aspergilli producing a high yield of strong acid-protease was known before the discovery of TPR–18 (IAM 2800 and ATCC 14752), which is classified as *Aspergillus oryzae*, particularly *Aspergillus oryzae* var. *microsporus* by the inventors et al. (Nogami, Tanaka et al.: J. Pharm. Soc. Japan, vol. 80, p. 365, p. 371, 1960).

It has been known that among the filamentous fungi with exception of the strain Aspergillus, there are included *Rhizopus javanicus*, *Mucor racemosus* and *Penicillium spinulosum* which produce an acid-protease in a comparatively greater amount than the amount of neutral-protease. But since their total protease productivenesses of any kind are very poor, they are not suitable for commercial use.

The present invention is based upon the use of a fungus which belongs to *Paecilomyces varioti* and produces a high yield of a strong acid stable proteolytic and amylolytic enzyme by propagation of this fungus upon culture media. The enzyme obtained has the optimum pH for protease activity at between pH 2 and 6, and for dextrinogenic amylase activity at between pH 3 and 7.

A *Paecilomyces varioti* fungus producing a fungicidal substance has been known (Sumiki et al.: J. Antibiotics Ser. A, vol. 12, p. 109, 1959) but no *Paecilomyces varioti* fungus producing a protein digestive substance has been known before the present invention.

The new strain, *Paecilomyces varioti* TPR–220, is derived from the screening of fungi isolated from the air in Toshimaku, Tokyo, Japan, in conventional manner.

METHOD FOR THE ISOLATION OF FUNGI

Petri-dishes, in which milk-casein agar adjusted to pH 4 with hydrochloric acid is placed, are exposed in the air for some time without covers, and then they are cultured at 30° C. in a thermostat.

From the fungi which have thus been grown, the filamentous fungi are separated and cultured purely in conventional manner.

The filamentous fungi thus obtained are screened for protease activity in comparison to *Aspergillus saitoi* IAM 2232. As the result a strain of *Paecilomyces varioti*, named TPR–220, was discovered having about a 1.7 times stronger proteolytic activity than the contrast, *Aspergillus saitoi* IAM 2232.

*Table I*

PROTEASE ACTIVITY IN KOJI EXTRACTS OF SELECTED STRAIN [ABSORBANCE] (FOLIN-PHENOL METHOD)

| Strain | Dilution ratio of enzyme solution | pH 3 | pH 6 |
|---|---|---|---|
| Contrast | 16 | 0.515 | 0.311 |
| Do | 32 | 0.300 | 0.159 |
| TPR–220 | 16 | 0.805 | 0.323 |
| TPR–220 | 48 | 0.345 | 0.153 |

Protease activity is determined as follows:

5 ml. (milliliters) of 0.6% milk casein solution containing a half quantity of buffer solution are added to 1 ml. of enzyme solution prepared by diluting koji extract with water, and then the mixture is kept at 40° C. with shaking for 10 minutes, after which there is added 5 ml. of 0.11 M trichloroacetic acid–0.22 M sodium acetate–0.33 M acetic mixture as reagent, and the whole allowed to stand for 30 minutes at 40° C. and then filtered through filter paper (e.g. Toyo-Roshi No. 4).

To 2 ml. of the filtrate, there are added 5 ml. of 0.4 M sodium carbonate (pH 6) or 0.55 M sodium carbonate (pH 5) and 1 ml. of Folin's reagent with shaking, and then the mixture is allowed to stand at 40° C. for 30 minutes, and then the absorbance of a 1 cm. absorption layer at 660 m$\mu$ is determined, using distilled water as a contrast.

The fungus is *Paecilomyces varioti* TPR–220. A culture of this TPR–220 has been deposited with the Applied Microorganism Institute of Tokyo University on March 3, 1960, where it has been entered as IAM 7999, and also with the American Type Culture Collection on January 29, 1962, as ATCC 14572.

The process of the invention essentially comprises growing *Paecilomyces varioti* TPR–220 on a suitable fermentation medium for the production of an acid stable proteolytic and amylolytic enzyme and producing the enzyme from the mould.

DESCRIPTION OF *PAECILOMYCES VARIOTI* TPR-220

Cultural and microscopic characteristics of the strain TPR-220—

Source: from the air
Substrate: Koji agar and Czapek agar
Culture media are following:

| | | |
|---|---|---|
| Water | milliliters | 1,000 |
| $NaNO_3$ | grams | 3.00 |
| $K_2HPO_4$ | do | 1.00 |
| $MgSO_4 \cdot 7H_2O$ | do | 0.50 |
| KCl | do | 0.50 |
| $FeSO_4 \cdot 7H_2O$ | do | 0.01 |
| Glucose | do | 30.00 |
| Agar | do | 15.00 |

Incubation temp.: 29° C. and 36° C.

Colony characteristics—
  Superficial growth: plain and funiculose consisting of creeping hyphae but upheaving sometimes in central area and floccose in circumferential area consisting of long aerial hyphae
  Rate of growth: spreading
  Character of growth: radiant
  Character of margin: irregular, not smooth
  Amount of sporulation: rich
  Colony color and color changes during growth period: olive to yellowish brown
  Transpired drop (exudate): sometimes, on Czapek agar; rather in early period of incubation; gelatinous; white colored; transparent, then turbid; at the center of colony
  Odor: a little musty
  Colony reverse: yellowish brown, greenish blue or black intracellular pigment spreads radiatedly covering all the reverse finally; no extra cellular pigment
Conidial stage—
  General view: sterigmata and conidia, resembling those produced in Penicillium, but penicilli imperfect; difference between conidiophore and basal hyphae, none
  Fertile hyphae: septate, variable in length, mostly creeping
  Conidiophore-like hyphae (branchlet): arises at right angles to creeping on aerial hyphae; septate, smooth walled; $1\mu$–$4\mu$, mostly $2\mu$–$3\mu$ in diameter; $10\mu$–$50\mu$ long
  Sterigmata: irregularly distributed upon short branchlet and fertile hyphae; mostly singly, when plural 2–5 members from a widely divergent fan-like shake; $10\mu$–$40\mu$ x $2\mu$–$7\mu$ in size, mostly $15\mu$–$20\mu$ x $4\mu$–$5\mu$; considerably long tubular, tapering into long conidium-bearing tubes mostly curved or bent slightly away from the axis of the sterigmatic cell, no branches and metulae
  Conidia: olive or yellowish brown; ovate, elliptical or fusiform; $3.5\mu$–$6\mu$ x $1.7\mu$–$2.5\mu$, mostly $4\mu$–$5\mu$ x $2.5\mu$; in chains upon the apex of sterigmata, smooth walled
  Sclerotia, perithecia, asci (and ascospores): none
  Macrospores: abundant in media, a few in air (outside of media): at the apex of short branch, which stands at right angles to creeping hyphae; sometimes 2–6 small granules (some $1\mu$ in diameter) are found inside of a macrospore
  Chlamidospore: very rare, when mature The above-described characters establish that the strain TPR-220 belongs to *Paecilomyces varioti* according to the classification method of Raper and Thom (Raper and Thom: A Manual of the Penicilli, The Williams & Wilkins Company, Baltimore, U.S.A., page 688, 1949), and the strain is therefore designated *Paecilomyces varioti* TPR-220.

The new strain, TPR-220, is derived as stated, from screening as to acid stable protease activity in contrast with *Aspergillus saitoi* IAM 2232, the new strain also showing acid stable dextrinogenic amylolytic activity.

As to acid stable dextrinogenic amylase, it is reported that black Aspergillus produces the enzyme (Negishi: Hakkokogaku Zazzi, vol. 34, p. 423, 1956), but as aforestated *Paecilomyces varioti* TPR-220 also has acid stable dextrinogenic amylolytic activity.

Amylase activities are determined on the wheat bran koji extract of TPR-220 and IAM O-16-1 (*Aspergillus oryzae*) on the acidic side by the iodometric method.

TPR 220 shows less activity of saccharogenic amylolytic and dextrinogenic amylolytic power than IAM O-16-1 at pH 5, but after pre-incubation of both enzyme solutions at pH 3, 40° C. and 30 min., TPR-220 shows an over 1.5 times stronger saccharogenic amylolytic power and an over 7 times greater residual dextrinogenic amylolytic power than IAM O-16-1.

The dextrinogenic powers of TPR-220 are 43% and 61% at pH 3 and pH 6 respectively, against the activate power rate (100%) at pH 6; on the contrary, the power of IAM O-16-1 is 15% at pH 3.

This result shows that the amylase, produced by TPR-220, contains an acid stable dextrinogenic amylase.

Table II
SACCHAROGENIC AMYLOLYTIC POWER IN KOJI EXTRACT OF SELECTED STRAIN (IODOMETRIC METHOD)

| Strain | pH 3 (ml.) | pH 6 (ml.) |
|---|---|---|
| O-16-1 | 5.00 | 12.15 |
| TPR-220 | 5.25 | 5.20 |

Saccharogenic amylolytic power is determined as follows:

1 ml. of enzyme solution prepared by diluting koji extract with the eight-fold quantity of water by volume is added to 20 ml. of 2% soluble starch solution containing a half quantity of buffer solution, and then the mixture is kept at 40° C. with shaking for 2 hours.

After two hours digestion, 20 ml. of 0.1 N $I_2$ solution is added, then there are added 16 ml. in case of pH 6.0 or over and 20 ml. in case of pH 5.0 or below, of 0.2 N NaOH to the digested mixture, which is then allowed to stand for 20 minutes with seal at room temperature (20–30° C.) in a thermostat. Then, 4 ml. of N $H_2SO_4$ are added and free iodine is titrated with 0.1 N $Na_2S_2O_3$. A blank test is carried out by the same procedure where enzyme solution is not added, after addition of iodine solution.

Amylase activity (ml.) corresponds to the difference between the assay value and the blank test value.

Table III
SACCHAROGENIC AMYLOLYTIC POWER TEST OF KOJI EXTRACT IN ACID MEDIUM (IODOMETRIC METHOD)
[Pre-incubation conditions: 40° C., 30 minutes]

| | Remaining amylolytic power (ml.) | | Remaining activity | |
|---|---|---|---|---|
| | O-16-1 Dilute (1) solution | TPR-220 Dilute (2) solution | O-16-1 | TPR-220 |
| pH on Pre-treating enzyme solution: | | | | |
| 2.81 | 3.76 | 5.65 | 39.4 | 61.7 |
| 3.27 | 4.38 | 7.87 | 45.9 | 85.9 |
| 3.80 | 5.14 | 8.46 | 53.9 | 92.4 |
| 4.84 | 9.34 | 8.88 | 98.0 | 97.0 |
| No pre-treating | 9.53 | 9.16 | 100.0 | 100.0 |

(1) Enzyme solution prepared by diluting koji extract with 4-fold quantity of water by volume.
(2) Enzyme solution prepared by diluting koji extract with 8-fold quantity of water by volume.

*Enzyme solution.*—Solution prepared by diluting koji extract with 4- or 8-fold quantity of water, 1 ml.

Pre-treating enzyme solution is prepared as follows:

Enzyme solution prepared by diluting koji extract with 4- or 8-fold quantity of water by volume is added equally to McIlvaine buffer solution, and the mixture allowed to stand with shaking for 30 minutes at 40° C. Then 2 ml. of the mixture is added to 20 ml. of the said substrate adjusted to pH 5.

Table IV

DEXTRINOGENIC AMYLOLYTIC POWER IN KOJI EXTRACTS AT VARIOUS pH's

| pH | 3.0 | 3.4 | 4.0 | 4.7 | 5.8 | 6.8 | 7.4 | 8.5 | 9.5 |
|---|---|---|---|---|---|---|---|---|---|
| O-16-1 | 13.1 | 30.4 | 72.5 | 78.0 | 85.1 | 81.2 | 66.3 | 26.7 | 11.3 |
| TPR-220 | 36.5 | 42.9 | 50.0 | 49.3 | 32.2 | 38.5 | 21.6 | 12.8 | 11.2 |

Dextrinogenic amylolytic power is determined as follows:

To 1 ml. of enzyme solution prepared by diluting koji extract with 24 times its volume of water is added 10 ml. of 1.9% soluble starch solution containing a half quantity of buffer solution, and then the mixture is kept at 40° C. with shaking for 30 minutes. After 30 minutes' digestion, 10 ml. of 0.2 N HCl are added and then 1 ml. of 0.001 N $I_2$ solution to the digested mixture, and the absorbance of 1 cm. absorption layer at 660 m$\mu$ determined at room temperature. A blank test is carried out by the same procedure using distilled water instead of enzyme solution.

Dextrinogenic amylolytic power is calculated as follows:

$$\text{Dextrinogenic amylolytic power} = \frac{\text{Blank value} - \text{assay value}}{\text{Blank value}} \times 100$$

Table V

DEXTRINOGENIC AMYLOLYTIC POWER TEST OF KOJI EXTRACT IN ACID MEDIUM

| | Remaining dextrinogenic amylolytic power | | Remaining activity | |
|---|---|---|---|---|
| | O-16-1 | TPR-220 | O-16-1 | TPR-220 |
| Pre-treating enzyme solution 40° C. pH 2.7: | | | | |
| 10 minutes | 1.9 | 57.0 | 1.92 | 59.3 |
| 30 minutes | 1.9 | 13.1 | 1.92 | 13.6 |
| No pre-treating | 99.1 | 96.3 | 100.0 | 100.0 |

Enzyme solution.—Solution prepared by diluting koji extract with the 16-fold quantity of water by volume, 1 ml.

Pre-treating enzyme is prepared as follows:

Enzyme solution prepared by diluting koji extract with 8 times of water by volume is added equally to McIlvaine's buffer solution of pH 2.7, and the mixture allowed to stand at 40° C. for 10 minutes and 30 minutes. Then 1 ml. of the mixture is added to 10 ml. of soluble starch containing a half quantity of McIlvaine's buffer solution of pH 5.

In culturing the new strain, Paecilomyces varioti TPR-220, which produces strong acid-stable digestive enzyme, the strain can be cultured by the wheat bran koji culture process which is generally employed for the purpose of obtaining digestive enzyme such as amylase or protease.

The new strain, Paecilomyces varioti TPR-220, is cultured on the koji culture medium which is prepared by mixing rice-powder, bean cake, corn meal and potassium diphosphate, and the koji are soaked in water, and then the protease activity of the koji extract determined in acid medium. As the result, it is found that the protease activity of the said strain cultured on the wheat bran koji medium containing 5–10% corn meal and 0.1–0.2% potassium diphosphate by weight of koji is stronger (10–40%) than that of the strain cultured on wheat bran koji medium not containing corn meal and potassium diphosphate.

Table VI

PROTEASE ACTIVITY IN KOJI EXTRACT OF SELECTED STRAIN (TPR-220) (FOLIN—PHENOL METHOD)

| | pH 3 | pH 6 |
|---|---|---|
| TPR-220: | | |
| Dilute solution (1) | 0.805 | 0.323 |
| Dilute solution (2) | 0.666 | 0.170 |
| Dilute solution (3) | 0.372 | 0.119 |
| Addition of corn meal and potassium biphosphate: | | |
| Dilute solution (1)' | 0.878 | 0.384 |
| Dilute solution (2)' | 0.664 | 0.204 |
| Dilute solution (3)' | 0.519 | 0.137 |

(1), (1)'=Enzyme solution prepared by diluting koji extract with 16-fold quantity of water by volume.
(2), (2)'=Enzyme solution prepared by diluting koji extract with 32-fold quantity of water by volume.
(3), (3)'=Enzyme solution prepared by diluting koji extract with 64-fold quantity of water by volume.

The acid-stable digestive enzyme is isolated from wheat bran koji culture medium propagated Paecilomyces varioti TPR-220 as follows:

Alcohol is added to the wheat bran koji extract, and the resultant precipitate is centrifuged and then washed several time with alcohol. The concentration of alcohol has to be 75% of its weight when alcohol is added to the extract after precipitation.

However, when the koji extract is adjusted to the range of pH 5.0–5.5 and concentrated at a temperature below 30° C., alcohol can be concentrated to ½ of its volume without destroying the enzyme and the enzyme remains stable during condensation of the extract. The enzyme can be rapidly precipitated from koji extract without suspension by adding alcohol to the koji extract after adjusting to the range of pH 5.0–5.5 with dilute HCl or dilute NaOH.

By using this concentrating process, the cost is reduced because of the increased recovery of the used alcohol. Furthermore, the enzyme prepared by this concentrating process is obtained in more excellent yield and activity than that prepared by the conventional culture process.

The acid stable protease of enzyme produced by TPR-220 shows very strong protease action at the range of pH 2 and pH 6; especially at pH 3, it shows stronger protease action, about 9 times stronger, than commercial koji diastase (see FIG. I).

FIG. I: Proteolytic power of each enzyme at various pH's. (1) Substrate: 0.6% milk casein solution, 5 cc.

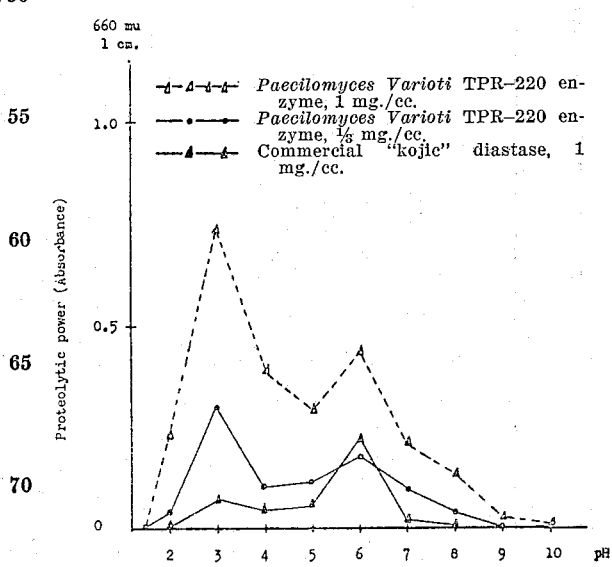

Assayed by the same method as in Table I.

The enzyme prepared by this invention reacts upon both hemoglobin and white albumin denatured by hydrochloric acid and urea; and also the protease action of the enzyme of the invention differs from that of commercial "kojic" diastase on the mechanism in respect of their behaviors upon hemoglobin denatured by hydrochloric acid and urea (see FIG. II and FIG. III).

FIG. II: Proteolytic power of each enzyme at various pH's. (2) Substrate: 0.6% hemoglobin denatured by hydrochloric acid, 5 cc.

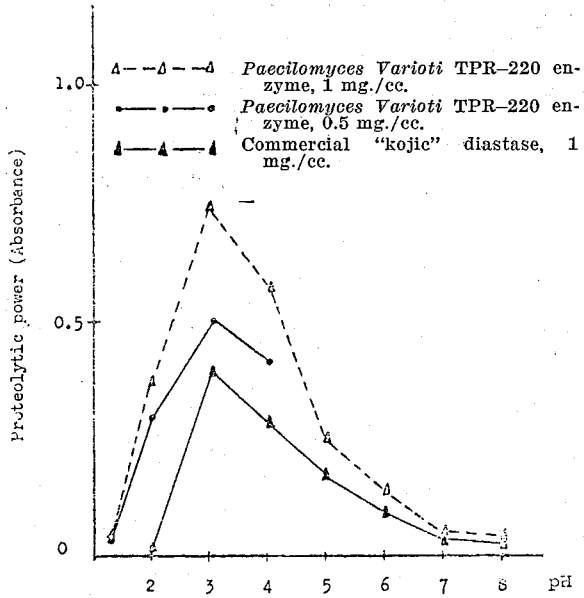

Assayed by the same method as in Table I.

FIG. III: Proteolytic power of each enzyme at various pH's. (3) Substrate: 0.6% hemoglobin (H) or 0.8% white albumin (E) denatured by urea.

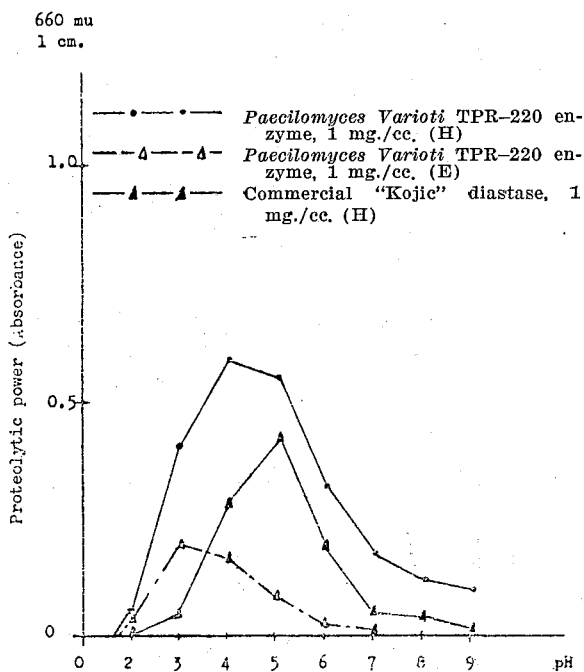

Assayed by the same method as in Table I.

The dextrogenic amylolytic power of the enzyme was 57% at pH 6 and 34% at pH 3. The contrast enzyme scarcely showed amylolytic power at pH 3 (see FIG. IV).

FIG. IV: Saccharogenic amylolytic power and dextrinogenic amylolytic power of each enzyme at various pH's. (4) Substrate: Saccharogenic amylolytic power (S) —2% soluble solution, 10 cc. dextrinogenic amylolytic power (D) —1.9% soluble starch solution, 10 cc. Conditions: S —40° C., one hour, D —40° C., 30 minutes.

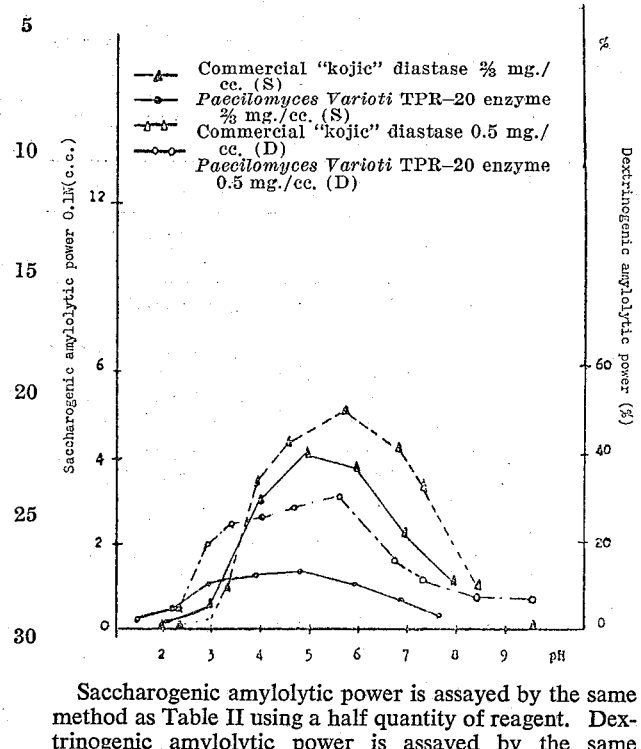

Saccharogenic amylolytic power is assayed by the same method as Table II using a half quantity of reagent. Dextrinogenic amylolytic power is assayed by the same method as in Table IV.

METHOD FOR THE ISOLATION OF FUNGI (*Paecilomyces varioti TPR–220*)

Outdoor or indoor air is principally selected for the material, from which the desired fungi are preferably isolated. In the first stage, primary culture medium for screening the fungi is prepared by mixing 1 gm. (gram) of milk casein and 50 gm. of glucose, and then adding 500 ml. of Sorensen sodium citrate buffer solution of pH 3 to the mixture, and sterilizing the mixture with shaking; then adding 500 ml. of water to the sterilized mixture and 20 gm. of agar, then inoculating 10 ml. of the autoclaved culture in a 9 cm. diameter petri dish and allowing the culture to stand in a cool place.

The casein in this medium is emulsive at pH 4.

For the purpose of selecting the strain, this medium is exposed in air for 15 minutes without cover and then cultured for 3 days with seal at 30° C. in a thermostat, and then the contrast, *Aspergillus saitoi* IAM 2232 and the strains with the same or larger clear casein digestive circle in the diameter are isolated in pure state, and the selected strains are cultured on koji agar medium.

About 300 strains are isolated on the primary medium, but the number of strains isolated on screening is 80 strains.

In the second stage, the selected strains are cultured on koji medium for secondary screening, and the koji are soaked in 5-fold quantity of water relative to the wheat bran by volume, and then the protease activity in koji extract of the selected strains is determined at pH 3 by Folin-phenol method in comparison with the contrast strain. Then 16 strains which appear to have protease activity in acid medium are selected by screening and then 7 strains having stronger enzyme digestive activity than the contrast are isolated by screening.

From the 7 strains, a strain belonging to *Paecilomyces varioti*, namely TPR–220, is isolated, having about 1.7 times stronger proteolytic activity than the contrast, *Aspergillus saitoi*, IAM 2232.

*Procedure of manufacturing the acid-stable digestive enzyme*

10 kilograms of wheat bran, 1 kilogram of corn meal, 10 grams of potassium biphosphate and 2 kilograms of chaff are mixed with 6 kilograms of water and sterilized for 2 hours at 100° C. and then allowed to stand in a cool place.

The medium so prepared is inoculated with *Paecilomyces varioti* TPR–220 seed spores. The so-obtained koji are divided into 20 petri dishes and bedded up on sterilized trays and then placed in an incubator of 100% relative humidity at 30° C.

Then the koji are stirred for 15 hours after sowing and then dried after the lapse of a further 24 hours from the stirring process and taken out of the incubator after 40 hours in total.

The koji are soaked completely in 50 kg. of water for 2 hours, and filtered by means of a Sharples centrifuge and 30 liters of clear enzyme solution are obtained.

The enzyme solution is adjusted to the range of pH 5–6 with dilute HCl or dilute soda-lime solution and then is concentrated to ½ of its volume at 25–30° C. in a vacuum dryer, the concentrated solution again adjusted to the range of pH 5.0–5.5 with dilute HCl or dilute soda-lime solution, and then is cooled to 0° C. with shaking in a refrigerator. 23 liters of alcohol (ethanol), cooled previously, is poured slowly into the enzyme solution, which is then allowed to stand overnight.

The precipitate so formed is centrifuged by means of a centrifuge and washed with 1 liter of cold alcohol in a mixer and collected and dried in a vacuum dryer. Yield of the enzyme is 336 grams.

The enzyme may also be obtained by adding 74 liters of alcohol to it instead of concentrating 30 liters of the above-described enzyme solution by the method above described. Yield of the enzyme is 312 gm.

*Table VII*

PROTEOLYTIC AND AMYLOLYTIC POWER OF ACID-STABLE DIGESTIVE ENZYME

|  | Concentrated method | | Conventional method | |
| --- | --- | --- | --- | --- |
|  | pH 2 | pH 6 | pH 3 | pH 6 |
| Saccharogenic amylolytic power (ml.) | 3.550 | 4.280 | 3.000 | 4.070 |
| Casein digestive power (absorbance): |  |  |  |  |
| Original solution | 0.735 | 0.326 | 0.739 | 0.315 |
| Dilute solution (1) | 0.507 | -------- | 0.501 | -------- |
| Dilute solution (2) | 0.319 | -------- | 0.320 | -------- |

(1) Enzyme solution prepared by diluting the original solution with 2-fold quantity of water by volume.
(2) Enzyme solution prepared by diluting the original solution with 4-fold quantity of water by volume.

Enzyme solution:
(a) Solution prepared by dissolving 100 milligrams of acid-stable digestive enzyme (the raw powder) in 50 ml. of water in case of amylase, 1 ml.
(b) Solution prepared by dissolving 100 mg. of the powder in 100 ml. of Sorensen sodium citrate buffer solution of pH 3.0 or pH 6.0 in case of protease, 1 ml.

Proteolytic and amylolytic power are determined respectivey by the same method as above-described.

The acid-stable digestive enzyme prepared by this invention has the activity of protease and the activity of dextrinogenic amylase as above-mentioned; therefore, it may be utilized in extended fields, for example, as a digestive for medicament, pre-treatment of materials for processing food or enzyme for ripening materials during production, clarificant of fermentative food such as beer, sake (Japanese wine) and vinegar and the like, and tenderizer of beef or corn before cooking.

What is claimed is:

1. The process of producing an acid stable proteolytic and amylolytic enzyme which comprises cultivating *Paecilomyces varioti* TPR–220 (IAM 7999 and ATCC 14572) on acidic culture medium, and isolating the enzyme thus accumulated.

2. The process according to claim 1, wherein the culture medium is acidic wheat bran koji culture-medium containing 5 to 10% cornmeal and 0.1–0.2% potassium diphosphate by weight of koji.

3. The process according to claim 1, wherein the cultivated mold is adjusted to the range of pH 5–6 and concentrated while cooling.

4. The process according to claim 1, wherein the cultivated mold is adjusted to the range of pH 5.0–5.5 and alcohol is added to precipitate the enzyme.

References Cited by the Examiner

UNITED STATES PATENTS

| 3,063,911 | 11/1962 | Tanaka et al. | 195—62 |
| 3,097,145 | 9/1963 | Shimazono et al. | 195—62 |
| 3,149,051 | 9/1964 | Yoshida et al. | 195—65 |

OTHER REFERENCES

Tanaka et al.: Yakuzaigaku (The Archives of Practical Pharmacy) 22, 111–119 (Sept. 10, 1962), abstracted in C.A. 58, 4770b.

A. LOUIS MONACELL, *Primary Examiner.*

L. M. SHAPIRO, *Assistant Examiner.*